United States Patent [19]

Oomura et al.

[11] Patent Number: 5,579,167
[45] Date of Patent: Nov. 26, 1996

[54] SUPER-WIDE FIELD EYEPIECE

[75] Inventors: Yasuhiro Oomura, Tokyo; Yoshiyuki Shimizu, Miura, both of Japan

[73] Assignee: Nikon Corporation, Tokyo, Japan

[21] Appl. No.: 285,518

[22] Filed: Aug. 4, 1994

[30]    Foreign Application Priority Data

Aug. 27, 1993  [JP]  Japan .................... 5-235498

[51] Int. Cl.$^6$ .................................. G02B 25/00
[52] U.S. Cl. .......................... 359/643; 359/645
[58] Field of Search ...................... 359/645, 644, 359/643

[56]           References Cited

U.S. PATENT DOCUMENTS 4,747,675  5/1988  Nagler ...................... 359/643
5,227,918  7/1993  Suzuki et al. ............... 359/644
5,255,121  10/1993  Suzuki ....................... 359/643

Primary Examiner—Scott J. Sugarman
Attorney, Agent, or Firm—Shapiro and Shapiro

[57]           ABSTRACT

A super-wide field eyepiece comprises, in succession from the incidence side of light, a first lens unit including a meniscus lens having its convex surface facing the incidence side and having positive or negative weak refractive power as a whole, a second lens unit including at least one lens surface having negative refractive power and having positive refractive power as a whole, and a third lens unit including at least two positive lenses and having positive refractive power as a whole, and an intermediate image is formed between the first lens unit and the second lens unit.

7 Claims, 3 Drawing Sheets

SUPER-WIDE FIELD EYEPIECE

BACKGROUND OF THE INVENTION

1. Field of the Invention

This invention relates to an eyepiece, and more particularly to a super-wide field eyepiece.

2. Related Background Art

Generally, many of eyepieces according to the prior art are of a simple construction comprising a combination of positive lenses, and in them, Petzval sum assumes a great positive value and therefore, curvature of image field is difficult to correct and distortion becomes great.

Further, if eye relief is made great, the spherical aberration of the pupil could not be sufficiently corrected and so-called eclipse has sometimes occurred around the field of view.

The correction of these aberrations has heretofore been solved by disposing a concave surface having negative refractive power, as disclosed, for example, in U.S. Pat. No. 5,227,918.

The eyepieces according to the prior art, however, have suffered from the inconvenience that curvature of image field is greatly fluctuated by a variation in the angle of the incident principal ray (a variation in the objective side exit pupil position) resulting from a difference or a variation in an objective or a lens barrel prism system and it is difficult to keep the correction of each aberration good.

SUMMARY OF THE INVENTION

The present invention has been made in view of the above-noted problem and has as its object the provision of a super-wide field eyepiece which satisfies the heretofore unsatisfied requirements for making Petzval sum small and making curvature of image field small, making distortion small, and sufficiently correcting the spherical aberration of the pupil and yet making eye relief large and in which even if the objective side exit pupil position varies, curvature of image field will not fluctuate and the correction of each aberration will be kept good.

To achieve the above object, a super-wide field eyepiece according to the present invention comprises in succession from the incidence side of light:

a first lens unit including a meniscus lens having its convex surface facing the incidence side and having positive or negative weak refractive power as a whole;

a second lens unit including at least one lens surface having negative refractive power and having positive refractive power as a whole; and a third lens unit including at least two positive lenses and having positive refractive power as a whole;

and is designed such that an intermediate image is formed between said first lens unit and said second lens unit.

When the focal length of said first lens unit is f1 and the focal length of said third lens unit is f3 and the focal length of the entire eyepiece system is f and the radius of curvature of the incidence side surface of said meniscus lens is R1 and the number of positive lenses constituting said third lens unit is m and the focal length of the ith positive lens from the incidence side of the lenses constituting said third lens unit is f3i, it is desirable fop the super-wide field eyepiece according to the present invention to satisfy the following conditions:

$$0.5 < f3/f < 1.5 \tag{1}$$

$$0.5 < f3i/(m \cdot f) < 1.5 \tag{2}$$

$$1.2 < R1/f < 5.0 \tag{3}$$

$$-0.25 < f/f1 < 0.25 \tag{4}$$

As shown in FIG. 5 of the accompanying drawings, by the pupil position changing, for example, from a to b, rays passing through the same position of an objective and entering the eyepiece does not vary in the beam width thereof but varies in the angle thereof. Accordingly, making aberration correction with respect to a beam of light off a wider range than the width of the actually seen beam of light becomes a condition for keeping the correction of each aberration good even if the pupil position changes.

In the super-wide field eyepiece of the present invention, coma is corrected for a beam of light of a width great over the whole area of the field of view, whereby it becomes possible to eliminate the fluctuation off curvature of image field resulting from a change in the pupil position.

Further, in the super-wide field eyepiece of the present invention, a surface having negative refractive power is introduced into the second lens unit G2 to thereby make Petzval sum small and make curvature of image field small, and a meniscus lens having its convex surface facing the incidence side is introduced into the first lens unit G1 to thereby correct the spherical aberration off the pupil well-balancedly.

In the present invention, in addition to the above-described constructional features, the conditions shown in the above-mentioned numerical expressions (1) to (4) are satisfied. The conditional expressions of the present invention will hereinafter be described.

Conditional expression (1) is a conditional expression for prescribing an appropriate range regarding the power arrangement of the third lens unit G3 and for making eye relief large and yet correcting coma, and preventing curvature of image field from fluctuating even if the pupil position changes.

If the upper limit value off conditional expression (1) is exceeded, it will become difficult to make eye relief sufficiently great, and this is inconvenient. On the other hand, if the lower limit value off conditional expression (1) is exceeded, it will become difficult to correct coma and the fluctuation of curvature of image field by a change in the pupil position will become too great, and this is not preferable.

Conditional expression (2) is a condition for correcting coma. If the range prescribed by this conditional expression is departed from, the correction of coma will become difficult and the fluctuation of curvature of image field by a change in the pupil position will become too great, and this is inconvenient.

That is, to correct coma over a wide range with respect to a beam of off-axis light, it is preferable to provide for such a power arrangement that the surfaces of the third lens unit G3 have substantially equally refractive power for off-axis rays of light. In other words, if even one of the positive lenses constituting the third lens unit G3 is too great or too small in refractive power, it will be difficult to keep the balance of aberrations, and this is inconvenient.

Conditional expression (3) is a conditional expression for prescribing an appropriate range regarding the radius of curvature of the incidence side surface of the meniscus lens in the first lens unit G1 and for correcting curvature of image field and distortion occurring by the third lens unit G3 satisfying conditional expressions (1) and (2).

If the upper limit value of conditional expression (3) is exceeded, distortion could not be completely corrected and will become under-corrected, and this is not preferable. If conversely, the lower limit value of conditional expression (3) is exceeded, high-order distortion will be liable to occur, and this is inconvenient.

Conditional expression (4) is a conditional expression for prescribing an appropriate range regarding the power arrangement of the first lens unit G1 and for maintaining eye relief sufficiently large and yet correcting coma and curvature of image field well when the meniscus lens in the first lens unit G1 is designed to satisfy conditional expression (3).

If the upper limit value of conditional expression (4) is exceeded, it will become impossible to keep the desired size of the eye relief, and this is riot preferable. If conversely, the lower limit value of conditional expression (4) is exceeded, high-order distortion and curvature of image field will be liable to occur, and this is inconvenient.

Further, it is conceivable that a focusing screen and a field stop are disposed near the intermediate image formed between the first lens unit G1 and the second lens unit G2 and therefore, it is desirable to effect achromatism with the meniscus lens in the first lens unit G1 as a cemented lens.

DETAILED DESCRIPTION OF THE PREFERRED EMBODIMENTS

Each embodiment of the present invention will hereinafter be described with reference to the accompanying drawings.

A super-wide field eyepiece according to the present invention is used at a position for receiving a beam of light from a sample passed through an objective, not shown.

Figure 1:
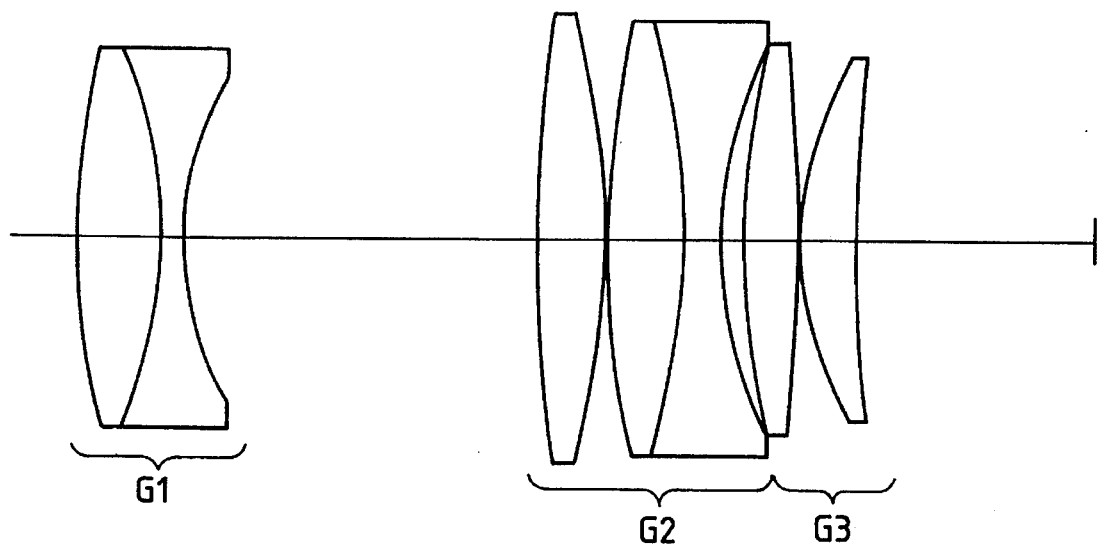
FIG. 1 shows the construction of an eyepiece according to a first embodiment of the present invention.

As shown in FIG. 1, the super-wide field eyepiece according to the present invention has, in succession from the incidence side of light, a first lens unit G1 and a second lens unit G2 of positive refractive power.

The beam of light from the sample forms an intermediate image, through the objective and the first lens unit G1, in the optical path between the first lens unit G1 including a meniscus lens having its convex surface facing the incidence side and having positive or negative weak refractive power as a whole and the second lens unit G2 including at least one lens surface having negative refractive power and having positive refractive power as a whole.

The light from the intermediate image forms a pupil on the emergence side of the second lens unit G2 through the second lens unit G2 including at least one lens surface having negative refractive power and having positive refractive power as a whole.

[Embodiment 1]

FIG. 1 shows the construction of an eyepiece according to a first embodiment of the present invention.

The shown eyepiece comprises, in succession from the incidence side (the left side as viewed in FIG. 1), a first lens unit G1 comprising a negative meniscus lens having its convex surface facing the incidence side which is a cemented lens consisting of a biconvex lens and a biconcave lens, a second lens unit G2 comprising a biconvex lens and a meniscus lens consisting of a biconvex lens and a biconcave lens cemented together and having its convex surface facing the incidence side, and having positive refractive power as a whole, and a third lens unit G3 comprising a biconvex lens and a positive meniscus lens having its convex surface facing the incidence side and having positive refractive power as a whole.

The values of the various elements of Embodiment 1 of the present invention are given in Table 1 below. In Table 1, the numbers at the left end represent the order of the lens surfaces from the object side, r represents the radius of curvature of each lens surface, d represents the spacing between adjacent lens surfaces, n and ν represent the refractive index and Abbe number, respectively, for d-ray ($\lambda$=587.6 nm).

TABLE 1

| | r | d | ν | n |
|---|---|---|---|---|
| 1 | 48.852 | 6.50 | 35.19 | 1.74950 |
| 2 | −31.357 | 1.50 | 41.42 | 1.57501 |
| 3 | 21.600 | 26.80 | | |
| 4 | 101.559 | 5.00 | 52.30 | 1.74810 |
| 5 | −59.953 | 0.200 | | |
| 6 | 60.726 | 5.89 | 53.93 | 1.71300 |
| 7 | −50.506 | 2.80 | 28.19 | 1.74000 |
| 8 | 28.063 | 1.80 | | |
| 9 | 53.812 | 4.20 | 55.60 | 1.69680 |
| 10 | −125.514 | 0.20 | | |
| 11 | 24.133 | 4.20 | 55.60 | 1.69680 |
| 12 | 116.095 | 17.84 | | |

(Condition-corresponding values)

m = 2
f1 = −250.55
f2 = −73.53
f3 = 24.353
(1) f3/f = 0.974
(2) f31/(m.f) = 1.092
(2) f32/(m.f) = 0.858
(3) R1/f = 1.954
(4) f/f1 = −0.100

[Embodiment 2]

Figure 2:
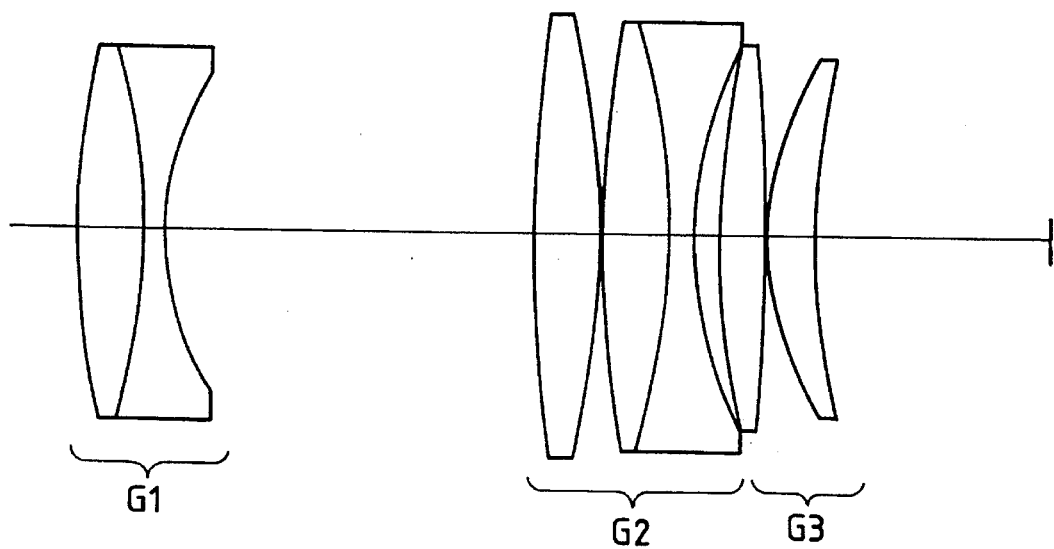
FIG. 2 shows the construction of an eyepiece according to a second embodiment of the present invention.

FIG. 2 shows the construction of an eyepiece according to a second embodiment of the present invention.

The shown eyepiece comprises, in succession from the incidence side (the left side as viewed in FIG. 2), a first lens unit G1 comprising a negative meniscus lens having its convex surface facing the incidence side which is a cemented lens consisting of a biconvex lens and a biconcave lens, a second lens unit G2 comprising a biconcave lens and a meniscus lens consisting of a biconvex lens and a biconcave lens cemented together and having its convex such as facing the incidence side, and having positive refractive power as a whole, and a third lens unit G3 comprising a biconvex lens and a positive meniscus lens having its convex surface facing the incidence side, and having positive refractive power as a whole.

The eyepiece off Embodiment 2 is similar in construction to the eyepiece of Embodiment 1, but differs from the latter in the refractive power and shape off each lens unit.

The values off the various elements off Embodiment 2 off the present invention are given in Table 2 below. In Table 2, the numbers at the left end represent the order of the lens surfaces from the object side, r represents the radius of curvature of each lens surface, d represents the spacing between adjacent lens surfaces, n and v represent the refractive index and Abbe number, respectively, for d-ray ($\lambda$=587.6 nm).

TABLE 2

| | r | d | v | n |
|---|---|---|---|---|
| 1 | 56.355 | 5.00 | 35.72 | 1.90265 |
| 2 | −45.052 | 1.50 | 41.42 | 1.57501 |
| 3 | 21.196 | 27.90 | | |
| 4 | 100.121 | 5.00 | 46.55 | 1.80411 |
| 5 | −63.212 | 0.200 | | |
| 6 | 80.454 | 5.20 | 46.55 | 1.80411 |
| 7 | −47.552 | 1.87 | 25.48 | 1.73038 |
| 8 | 28.250 | 1.90 | | |
| 9 | 52.756 | 3.60 | 52.30 | 1.74810 |
| 10 | −146.186 | 0.20 | | |
| 11 | 22.769 | 3.68 | 52.30 | 1.74810 |
| 12 | 52.887 | 17.72 | | |

(Condition-corresponding values)

m = 2
f1 = −415.12
f2 = −75.26
f3 = 25.80
(1) f3/f = 1.032
(2) f31/(m·f) = 1.045
(2) f32/(m·f) = 1.016
(3) R1/f = 2.254
(4) f/f1 = −0.060

[Embodiment 3]

Figure 3:
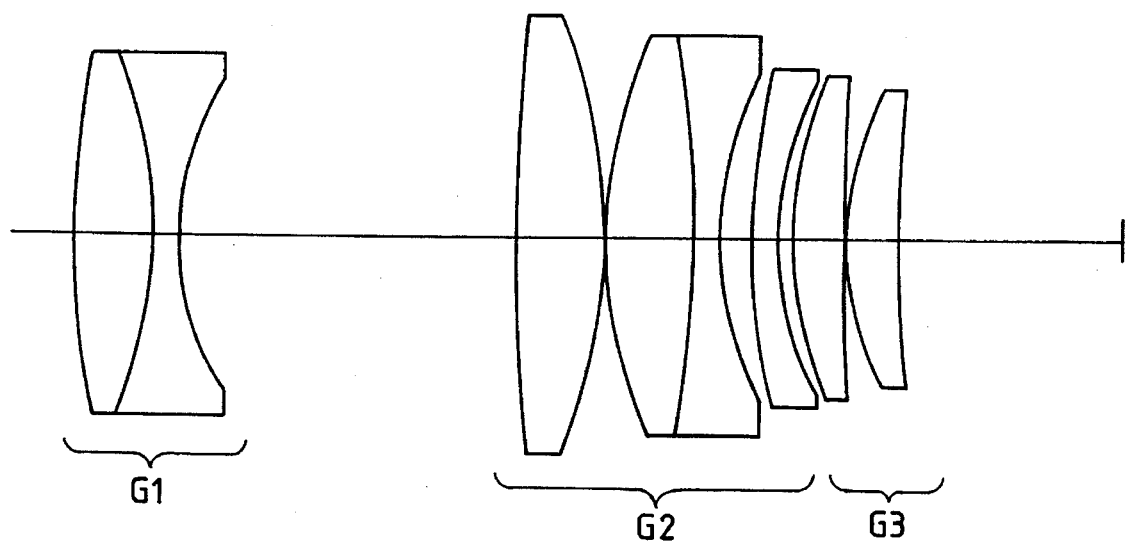
FIG. 3 shows the construction of an eyepiece according to a third embodiment of the present invention.

FIG. 3 shows the construction of an eyepiece according to a third embodiment of the present invention.

The shown eyepiece comprises, in succession from the incidence side (the left side as viewed in FIG. 3), a first lens unit G1 comprising a negative meniscus lens having its convex surface facing the incidence side which is a cemented lens consisting of a biconvex lens and s biconcave lens, a second lens unit G2 comprising s biconvex lens, a meniscus lens consisting of a biconvex lens and a biconcave lens cemented together and having its convex surface facing the incidence side, and a negative meniscus lens having its convex surface facing the incidence side, and having positive refractive power as a whole, and a third lens unit G3 comprising a positive meniscus lens having its convex surface facing the incidence side and a positive meniscus lens having its convex surface facing the incidence side, and having positive refractive power as a whole.

The eyepiece of Embodiment 3 is similar in construction to the eyepiece of Embodiment 1, but differs from the latter in the refractive power and shape of each lens unit.

The values of the various elements of Embodiment 3 of the present invention are given in Table 3 below. In Table 3, the numbers at the left end represent the order of the lens surfaces from the object side, r represents the radius of curvature of each lens surface, d represents the spacing between adjacent lens surfaces, n and v represent the refractive index and Abbe number, respectively, for d-ray ($\lambda$=587.6 nm).

TABLE 3

| | r | d | v | n |
|---|---|---|---|---|
| 1 | 56.147 | 6.31 | 35.19 | 1.74950 |

TABLE 3-continued

| | r | d | v | n |
|---|---|---|---|---|
| 2 | −32.602 | 2.00 | 41.42 | 1.57501 |
| 3 | 21.500 | 26.40 | | |
| 4 | 139.040 | 7.00 | 55.60 | 1.69680 |
| 5 | −40.418 | 0.200 | | |
| 6 | 34.969 | 7.00 | 53.93 | 1.71300 |
| 7 | −77.427 | 2.00 | 29.46 | 1.71736 |
| 8 | 24.993 | 2.50 | | |
| 9 | 48.852 | 2.00 | 32.17 | 1.67270 |
| 10 | 23.574 | 1.20 | | |
| 11 | 28.609 | 4.00 | 55.60 | 1.69680 |
| 12 | 287.826 | 0.20 | | |
| 13 | 22.561 | 4.00 | 57.53 | 1.67025 |
| 14 | 96.382 | 17.53 | | |

(Condition-corresponding values)

m = 2
f1 = −123.28
f2 = −188.92
f3 = 22.60
(1) f3/f = 0.904
(2) f31/(m·f) = 0.906
(2) f32/(m·f) = 0.860
(3) R1/f = 2.326
(4) f/f1 = −0.203

[Embodiment 4]

Figure 4:
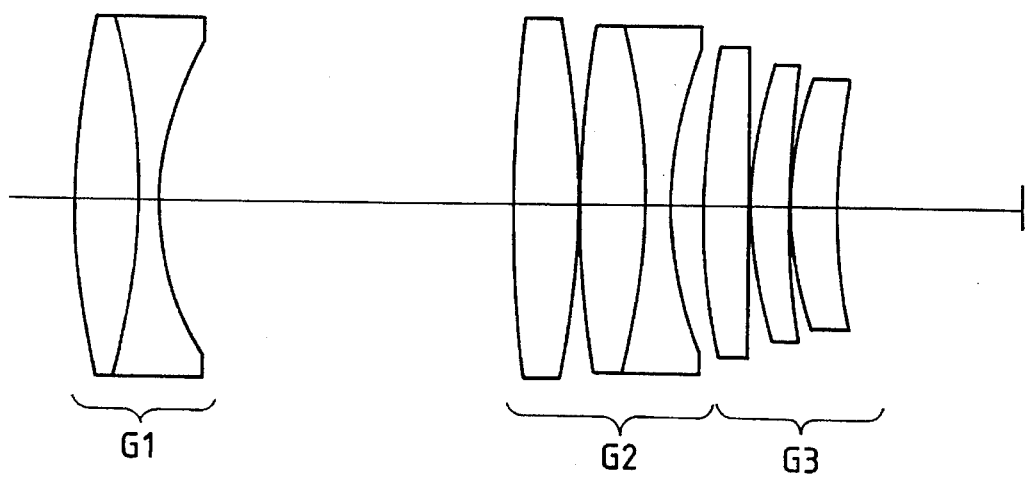
FIG. 4 shows the construction of an eyepiece according to a fourth embodiment of the present invention.
Figure 5:
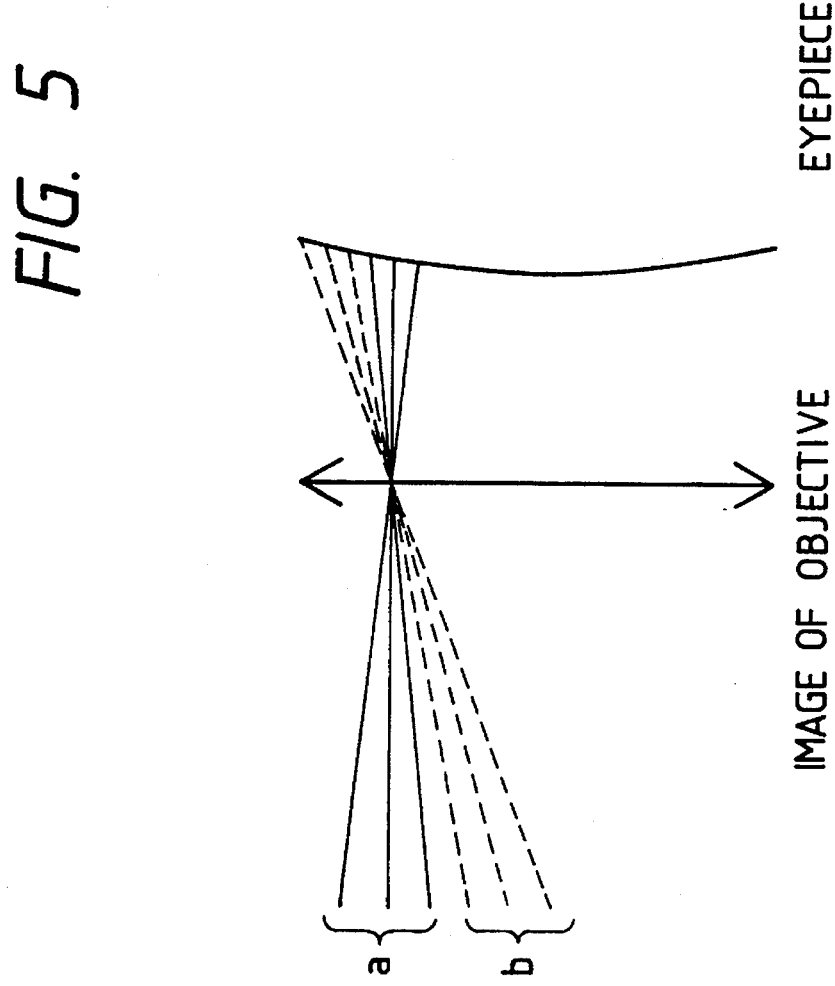
FIG. 5 shows the state of rays of light entering an eyepiece when the position of the objective side exit pupil changes.

FIG. 4 shows the construction of an eyepiece according to a fourth embodiment of the present invention.

The shown eyepiece comprises, in succession from the incidence side (the left side as viewed in FIG. 4), a first lens unit G1 comprising a negative meniscus lens having its convex surface facing the incidence side which is a cemented lens consisting of a biconvex lens and a biconcave lens, a second lens unit G2 comprising a biconvex lens and a meniscus lens consisting of a biconvex lens and a biconvex lens cemented together and having its convex surface facing the incidence side, and having positive refractive power as a whole, and a third lens unit G3 comprising a plano-convex lens, a positive meniscus lens having its convex surface facing the incidence side and a positive meniscus lens having its convex surface facing the incidence side, and having positive refractive power as a whole.

The eyepiece of Embodiment 4 is similar in construction to the eyepiece of Embodiment 1, but differs from the latter in the refractive power and shape of each lens unit.

The values of the various elements of Embodiment 4 of the present invention are given in Table 4 below. In Table 4, the numbers at the left end represent the order of the lens surfaces from the object side, r represents the radius of curvature of each lens surface, d represents the spacing between adjacent lens surfaces, n and v represent the refractive index and Abbe number, respectively, for d-ray ($\lambda$=587.6 nm).

TABLE 4

| | r | d | v | n |
|---|---|---|---|---|
| 1 | 54.175 | 5.00 | 35.74 | 1.90265 |
| 2 | −45.052 | 1.50 | 41.42 | 1.57501 |
| 3 | 22.000 | 27.90 | | |
| 4 | 94.719 | 5.00 | 46.55 | 1.80411 |
| 5 | −65.000 | 0.200 | | |
| 6 | 80.454 | 5.20 | 46.55 | 1.80411 |
| 7 | −47.552 | 1.87 | 25.48 | 1.73038 |
| 8 | 28.250 | 2.50 | | |
| 9 | 54.315 | 3.60 | 52.30 | 1.74810 |

TABLE 4-continued

| | r | d | v | n |
|---|---|---|---|---|
| 10 | ∞ | 0.20 | | |
| 11 | 30.530 | 3.00 | 52.30 | 1.74810 |
| 12 | 65.000 | 0.20 | | |
| 13 | 26.432 | 3.68 | 52.30 | 1.74810 |
| 14 | 47.000 | 14.483 | | |

(Condition-corresponding values)

m = 2
f1 = −1267.98
f2 = −75.26
f3 = 25.00
(1) f3/f = 1.000
(2) f31/(m.f) = 0.968
(2) f32/(m.f) = 0.989
(2) f33/(m.f) = 1.000
(3) R1/f = 2.167
(4) f/f1 = −0.020

As described above, according to the present invention, there can be realized a super-wide field eyepiece in which distortion is small and eye relief is long and Petzval sum is small and therefore the flatness of the image plane is good and even if the incidence side exit pupil position changes, curvature of image field will not fluctuate and the correction of each aberration will be kept good.

What is claimed is:

1. A super-wide field eyepiece comprising, in order from an incidence side of light;

a first lens unit having a lens with a surface closest to the incidence side which is convex on the incidence side, and a lens with a surface closest to an exit side which is concave on the exit side, the first lens unit being made in a meniscus form as a whole;

a second lens unit including at least one lens having negative refractive power, and having positive refractive power as a whole; and a third lens unit including at least two positive lenses, and having positive refractive power as a whole;

an air space between the surface of the first lens unit closest to the exit side and the surface of the second lens unit closest to the incidence side being greatest of all air spaces formed on an optical axis;

wherein said super-wide field eyepiece satisfies the following conditions:

0.5<f3/f<1.5

0.5<f3i/(m.f)<1.5

1.2<R1/f<5.0

−0.25<f/f1<0.25 where f1 is the focal length of said first lens unit, f3 is the focal length of said third lens unit, f is the focal length of the entire eyepiece system, R1 is the radius of curvature of the convex surface, m is the number of the positive lenses constituting said third lens unit, and f3i is the focal length of the ith lens from the incidence side of the lenses constituting said third lens unit.

2. A super-wide field eyepiece comprising in succession from the incidence side of light;

a first lens unit including a meniscus lens having its convex surface facing the incidence side and having positive or negative weak refractive power as a whole;

a second lens unit including at least one lens surface having negative refractive power and having positive refractive power as a whole; and a third lens unit including at least two positive lenses and having positive refractive power as a whole;

an intermediate image being formed between said first lens unit and said second lens unit;

said eyepiece satisfying the following conditions:

0.5<f3/f<1.5

0.5<f3i/(m.f)<1.5

1.2<R1/f<5.0

−0.25<f/f1<0.25 where f1 is the focal length of said first lens unit, f3 is the focal length of said third lens unit, f is the focal length of the entire eyepiece system, R1 is the radius of curvature of the incidence side surface of said meniscus lens, m is the number of the positive lenses constituting said third lens unit, and f3i is the focal length of the ith positive lens from the incidence side of the lenses constituting said third lens unit.

3. A super-wide field eyepiece according to claim 2, wherein said meniscus lens consists of two lenses cemented to each other.

4. A super-wide field eyepiece according to claim 3, wherein said second lens unit includes, in the order from the incidence side, one positive lens, and a meniscus lens consisting of two lenses cemented to each other and having its convex surface facing the incidence side.

5. A super-wide field eyepiece according to claim 4, wherein said third lens unit consists of single lenses.

6. A super-wide field eyepiece according to claim 2, wherein said second lens unit includes, in the order from the incidence side, one positive lens, and a meniscus lens consisting of two lenses cemented to each other and having its convex surface facing the incidence side.

7. A super-wide field eyepiece according to claim 2, wherein said third lens unit consists of single lenses.

* * * * *